United States Patent
Soldati et al.

(10) Patent No.: US 10,264,582 B2
(45) Date of Patent: Apr. 16, 2019

(54) NETWORK DEVICE AND USER DEVICE AND METHODS THEREOF

(71) Applicant: Huawei Technologies Co., Ltd., Shenzhen (CN)

(72) Inventors: Pablo Soldati, Kista (SE); George Koudouridis, Kista (SE)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

(21) Appl. No.: 15/403,056

(22) Filed: Jan. 10, 2017

(65) Prior Publication Data
US 2017/0150504 A1 May 25, 2017

Related U.S. Application Data

(63) Continuation of application No. PCT/EP2014/064901, filed on Jul. 11, 2014.

(51) Int. Cl.
*H04W 72/04* (2009.01)

(52) U.S. Cl.
CPC ..... *H04W 72/0453* (2013.01); *H04W 72/042* (2013.01); *H04W 72/0406* (2013.01); *H04W 72/0413* (2013.01)

(58) Field of Classification Search
CPC ......... H04W 72/0453; H04W 72/0413; H04W 72/042
See application file for complete search history.

(56) References Cited

U.S. PATENT DOCUMENTS

| | | | |
|---|---|---|---|
| 2004/0125768 A1* | 7/2004 | Yoon | H04L 5/026 370/331 |
| 2010/0003990 A1 | 1/2010 | Suemitsu et al. | |
| 2011/0216730 A1* | 9/2011 | Kim | H04L 5/0007 370/329 |
| 2012/0134328 A1* | 5/2012 | Gauvreau | H04L 5/0037 370/329 |

(Continued)

FOREIGN PATENT DOCUMENTS

| | | | | |
|---|---|---|---|---|
| WO | 2010088586 A2 | 8/2010 | | |
| WO | WO 2010088586 A2 * | 8/2010 | .......... | H04W 72/082 |

*Primary Examiner* — Ajit Patel
(74) *Attorney, Agent, or Firm* — Slater Matsil, LLP

(57) ABSTRACT

A network node and a user device and methods thereof are described. A network node includes a transceiver, and a processor. The transceiver transmits a frequency utilization signal $S_{FUS}$ having a frequency utilization information (FUI) associated with at least one available frequency spectrum segment, and receives a communication preference signal $S_{CPS}$. The processor assigns at least one frequency spectrum segment for communication. A user device includes a transceiver and a processor. The transceiver of the user device receives a frequency utilization signal $S_{FUS}$ comprising frequency utilization information (FUI) associated with at least one available frequency spectrum segment. The processor of the user device determines communication preference information (CPI) for the user device; and the transceiver of the user device transmits a communication preference signal $S_{CPS}$.

17 Claims, 8 Drawing Sheets

(56) References Cited

U.S. PATENT DOCUMENTS

| | | | | |
|---|---|---|---|---|
| 2013/0028128 A1* | 1/2013 | Novak | H04L 1/00 | 370/252 |
| 2013/0163543 A1* | 6/2013 | Freda | H04W 72/0406 | 370/329 |
| 2013/0229989 A1* | 9/2013 | Natarajan | H04W 72/042 | 370/329 |
| 2014/0003239 A1* | 1/2014 | Etemad | H04W 28/08 | 370/235 |
| 2014/0119334 A1* | 5/2014 | Kazmi | H04W 24/10 | 370/330 |
| 2014/0269547 A1* | 9/2014 | Valliappan | H04W 16/02 | 370/329 |
| 2015/0009826 A1* | 1/2015 | Ma | H04W 28/0268 | 370/235 |
| 2015/0009909 A1* | 1/2015 | Lundgren | H04W 72/0453 | 370/329 |
| 2015/0208410 A1* | 7/2015 | Koutsimanis | H04W 24/10 | 370/252 |
| 2016/0057759 A1* | 2/2016 | Seo | H04W 72/0406 | 370/329 |

* cited by examiner

NETWORK DEVICE AND USER DEVICE AND METHODS THEREOF

CROSS-REFERENCE TO RELATED APPLICATIONS

This application is a continuation of International Application No. PCT/EP2014/064901, filed on Jul. 11, 2014, the disclosure of which is hereby incorporated by reference in its entirety.

TECHNICAL FIELD

The present invention relates to a network node and a user device for wireless communication systems. Furthermore, the present invention also relates to corresponding methods, a computer program, and a computer program product.

BACKGROUND

To meet the surge in traffic demand and connectivity, radio technology for communication systems is gradually shifting towards a more flexible utilization of the available frequency spectrum at the network nodes forming the radio access network infrastructure, as well as toward denser deployments of low-powered network nodes with smaller coverage area. In this context, the quality of experience of a user (e.g., in terms of average data rate) can be improved through more flexible and dynamic connections established with the network nodes having the potential and the resources to provide the desired service. Thus, user devices should be connected to network nodes that not necessarily provide the best signal strength but rather have more resource available or, equivalently, less traffic load per frequency resource. To that end, network nodes can be enabled to operate in multiple (not necessarily contiguous) frequency spectrum bandwidths, hereafter referred to as frequency spectrum segments or frequency bands available at a network node.

A frequency spectrum segment is a portion of frequency spectrum band available at a network node. Thus, the available frequency band of a network node is divided into a number of segments, where the size of the segments may be different at different network nodes. For instance, a frequency spectrum segment may comprise a portion or an entire component carrier (as in the 3GPP Long Term Evolution, LTE system) or a portion or the entire frequency bandwidth associated with a radio access technology (RAT) available at a network node. The term available indicates that a frequency spectrum segment is a resource of a network node. Thus, a network node may autonomously determine, or may be configured to use/activate one or more frequency spectrum segments on which it can operate.

In this context, the utilization of frequency spectrum and RAT available at a network node shall be adapted depending on the traffic/service demand, the type of traffic, the interference pattern, as well as the energy cost of operating with a larger portion of frequency spectrum or multiple RATs. In turn, the problem of controlling and making the utilization of spectrum flexible at the network side becomes a problem of associating/connecting user devices to frequency spectrum segment(s), and hence to the corresponding network node(s), that can provide the service desired by the user device, rather than assuring a connection to the network node that offers the best signal strength.

Thus, resource allocation methods for flexible spectrum utilization at the network nodes shall comprise more advanced cell-association and inter-frequency load balancing schemes that adapt the utilization of frequency spectrum at the network nodes so as to comply with users' traffic/service demands and network's energy costs.

In traditional cellular radio systems, user devices access the network by first searching synchronization signals transmitted by network nodes and measuring the strength of the associated reference signals, and then by transmitting an access request to the network node that provides the strongest received signal. A user device already connected to the network, on the other hand, is typically required to monitor the signal strength of multiple network nodes so as to facilitate handover from a serving network node to another network node when the signal strength of the latter becomes better than the signal strength of the former. Either procedure aims at assuring that the user device is always associated or connected to the network node that provides the best signal strength. This, however, does not guarantee the best usage of the network resources nor assures the best service to the users.

For instance, assuming a network node n applies an equal share of the available time-frequency radio resources to the served user devices, the theoretically achievable average user data rate for a user m can be modelled through the Shannon bound as $$r_{m,n} = \frac{W_n}{L_n}\log_2(1 + SINR_{m,n}),$$

where $W_n$ and $L_n$ are the frequency spectrum bandwidth and the traffic load (e.g., expressed as the average number of active users served) of access node n, while $SINR_{m,n}$ is the signal to noise plus interference ratio experienced by user m from access node n. It is clear from this equation that a network node n with lower traffic load $L_{n'}<L_n$ can provide a higher average data throughput despite a lower signal strength (i.e., when $SINR_{m,n'}<SINR_{m,n}$).

The 3GPP LTE-A Rel.-12 system has partially addressed this issue by investigating mechanisms for balancing the traffic load among network nodes. The purpose of load shifting/balancing is to improve the system performance by changing the traffic load distribution over network nodes either to obtain a more evenly distributed traffic load across the network nodes or to concentrate the traffic into fewer network nodes so as to mitigate inter-cell interference. To that end, it was proposed to achieve load balancing/shifting in the 3GPP system via cell association through one of the following methods:

Cell association based on the strongest reference signal received power (RSRP) in conjunction with a cell association bias;

Cell association based on the strongest reference signal received quality (RSRQ) in conjunction with a cell association bias or threshold;

Cell association based on long-term SINR UE measurements in conjunction with a cell association bias;

Cell association based on a function of UE measurements (RSRP, RSRQ, long-term SINR.) and of network-side information (e.g. cell resource utilizations);

Cell association based on RSRQ or SINR UE measurements within shortened measurement interval.

Another conventional solution is enhanced frequency-domain interference coordination in LTE when two component carriers (i.e., frequency spectrum bands) are available at a network node. In order to reduce the inter-cell interference, the utilization/activation of component carriers should be coordinated among network nodes. To this end, the available component carriers are categorized into secondary cells (Scells) and primary cell (Pcell). Then, in a first step inter-cell interference is reduced by selecting a Pcell for different geographical areas, similarly to frequency reuse schemes cellular systems. In a second step, the secondary Scell is activated at a network node for a specific user device when high data throughput is requested. One criterion to add an additional Scell is, for instance, when the RSRQ of the Scell is higher than a certain threshold.

A drawback of the first conventional solution is that it aims at equalizing the load among network nodes without taking into account how the load could be distributed in relation to the available frequency spectrum or radio access technologies available at each network node. An additional drawback of the first conventional solution is that the cell association criterion used for balancing the user distribution among network nodes does not take into account the traffic demand of the user. In other words, balancing the user distribution does not assures per se a fair distribution of the data traffic, e.g. users with very high traffic demand (and hence needing more time-frequency resources) may end up being associated with the same network node whilst it would be more beneficial to distributed them among multiple network nodes. Thirdly, the cell association criteria used to distribute the users among network nodes only accounts for signal quality measures at the user devices, which is not per se an indication of the service (e.g., data throughput) that can be offered to the user device by a network node.

A drawback of the second conventional solution is that it is designed for two component carriers and assumes a static allocation of the primary component carrier for network nodes (i.e., the Pcell), thus requiring a careful cell planning at the deployment stage. In practice, more than two component carriers may be made available at the network nodes and their utilization should be not constrained.

SUMMARY

An objective of embodiments of the present invention is to provide a solution which mitigates or solves the drawbacks and problems of conventional solutions for transmitting streams of information bits in wireless communication systems.

According to a first aspect of the invention, the above mentioned and other objectives are achieved with a network node for a wireless communication system, the network node comprising a transceiver, and a processor. The transceiver is configured to transmit a frequency utilization signal $S_{FUS}$ comprising frequency utilization information associated with at least one available frequency spectrum segment of the wireless communication system; and receive a communication preference signal $S_{CPS}$ associated with at least one user device. The communication preference signal $S_{CPS}$ comprises communication preference information for the at least one user device. The processor is configured to assign, for the at least one user device, at least one frequency spectrum segment for communication in the wireless communication system based on the communication preference information.

Embodiments of the present invention enable network nodes to control and optimize the traffic load balance among the available frequency spectrum segments by exploiting communication preference signals from user devices.

Furthermore, user devices are enabled to select at least a preferred frequency spectrum segments and/or a network node for communicating/joining the radio communication network based on at least the frequency utilization signal received from the radio network (i.e. from a network node of the radio network).

It is considered a wireless communication system where network nodes can be configured to operate in multiple frequency bands, with each frequency band being partitioned into a number of, in this disclosure called frequency spectrum segments. In LTE terminology, a spectrum segment may be a portion of a frequency component carrier or the entire frequency component carrier. In another example, a frequency spectrum segment may be a portion of the entire frequency band associated with a specific radio access technology (RAT) available at a network node. The frequency spectrum segments available at a network node may not necessarily be contiguous in the frequency domain nor have equal size (i.e., bandwidth). Further, the size of frequency spectrum segments at a network node can be static or dynamically configurable over time to adapt to e.g., load, traffic, demand or other network parameters related to frequency spectrum segments. Thereby, the overall frequency spectrum bandwidth available at a network node, eventually associated to multiple RATs, can be regarded as virtual spectrum bandwidth formed by multiple frequency spectrum segments.

Moreover, an "or" in this description and the corresponding claims is to be understood as a mathematical OR which covers "and" and "or", and is not to be understand as an XOR (exclusive OR).

In a first possible implementation form of the network node according to the first aspect, the frequency utilization information comprises one or more in the group comprising: load information, frequency bandwidth information, utilization priority information, energy cost information, supportable traffic load information, supportable/admissible service type information, supportable/admissible traffic type information, and uplink or downlink carrier type information.

The load, traffic, and service information enable a user device to estimate the average per-user spectral efficiency offered in a certain frequency spectrum segment by a network node. By additionally indicating the frequency bandwidth, a user device is enabled to estimate the average data throughput achievable in a certain frequency spectrum segment.

Preference to utilize and/or activate an available frequency spectrum segment, energy cost associated to the utilization of an available frequency spectrum segment, an estimate of the running cost of the spectrum segment, an estimate of the running cost of the spectrum segment normalized with respect to its load. This information has the benefit to enable user devices to account for the preference of spectrum utilization at the network node and the energy consumption, respectively.

Service type information allows the network to bundle different traffic services to different spectrum segments. For instance, this would enable a network operator to direct all users with a certain type of traffic (e.g., voice, video, etc) to be served by specific spectrum segments.

In a second possible implementation form of the network node according to the first aspect, the processor is further configured to: determine, based on the communication preference information, frequency assignment information associated with the at least one frequency spectrum segment for the at least one user device; and the transceiver is further configured to: transmit a frequency assignment control signal $S_{FACS}$ comprising the frequency assignment information to the at least one user device.

With the second possible implementation form an admission grant/denial can be associated to a specific frequency spectrum segment or to a group of frequency spectrum segments. A benefit of this is to enable a fast admission control to user devices to spectrum segments or network nodes for inter-frequency load balancing/offloading and handover.

In a third possible implementation form of the network node according to the second possible implementation form of the first aspect, the frequency assignment information comprises one or more in the group comprising: admission grant, admission denial, frequency address for the at least one frequency spectrum segment for communication, radio access technology, and network node identity.

With signaling according to the third possible implementation form fast admission control is enabled to user devices to spectrum segments or network nodes for inter-frequency load balancing/offloading and handover.

In a fourth possible implementation form of the network node according to the second or third possible implementation form of the first aspect, the transceiver is further configured to: receive additional frequency assignment information associated with the at least one user device from other network nodes of the wireless communication system; transmit the additional frequency assignment information to the at least one user device; or wherein the processor is further configured to: use the additional frequency assignment information for serving the at least one user device.

With the fourth possible implementation form frequency assignment is enabled for a user device determined in a network node to be transmitted to the user device by one or more other network nodes.

In a fifth possible implementation form of the network node according to the first aspect, the transceiver is further configured to transmit the frequency utilization signal $S_{FUS}$ over a broadcast channel, or over a physical control channel, or over a higher layer Radio Resource Control, RRC, control channel of the wireless communication system.

With the fifth possible implementation form of broadcasting a frequency spectrum utilization signal all the potential system user devices are able to receive the frequency spectrum utilization signal regardless of whether they have a connection already established with the system or not. By transmitting the spectrum utilization signal as part of a physical control channel or a RRC control channel a network node may indicate changes in the frequency spectrum utilization to a particular group of user devices or to a single user device.

In a sixth possible implementation form of the network node according to the first aspect, the network node is an access node or a network control node.

The sixth possible implementation form allows for centralized or disturbed control in the wireless communication system.

In a seventh possible implementation form of the network node according to the first aspect, the transceiver is further configured to: receive additional frequency utilization information from other network nodes. The processor is further configured to: use the additional frequency utilization information when assigning the at least one frequency spectrum segment.

The seventh possible implementation form enables coordination among network nodes when determining user device assignment.

In an eighth possible implementation form of the network node according to the first aspect, the transceiver is further configured to: receive further communication preference information for the at least one user device received from at least another network node.

The eighth possible implementation form enables a centralized system in which the user device can transmit its CPI to network control node which then distributes the CPI to corresponding network nodes which may establish a connection to the user device based on the CPI. Hence, this has the advantage that not all network nodes need to have the capability of receiving the CPI but a system with such functionality can still be established. Furthermore, resources on the air interface can be saved.

Alternatively or additionally, the transceiver can be configured to receive the communication preference information directly from the user device.

According to a second aspect of the invention, the above mentioned and other objectives are achieved with a user device for a wireless communication system, the user device comprising a transceiver and a processor; wherein the transceiver configured to: receive a frequency utilization signal $S_{FUS}$ comprising frequency utilization information associated with at least one available frequency spectrum segment. The processor is configured to: determine, based on the frequency utilization information, communication preference information for the user device. The transceiver is further configured to: transmit a communication preference signal $S_{CPS}$ comprising the communication preference information to at least one network node.

The user device, on the other hand, are enabled to select at least a preferred frequency spectrum segments and/or a network node for communicating/joining the radio communication network based on at least a frequency utilization signal received from the radio network. Hence, the user device can actively support in the assignment of frequency spectrum segments and/or network nodes to the user device. By this feature, it can be ensured, that the frequency spectrum segments and/or network nodes assigned to the user device from the network fit the requirements of the user device.

In a ninth possible implementation form of the network node according to the first aspect or in a first possible implementation form of the user device according to the second aspect, the frequency utilization information is further associated with at least one network node of the wireless communication system.

The at least one network node can be any of: the network node; other network nodes of the wireless communication system; or the network node and other network nodes of the wireless communication system; since the network node may transmit a frequency utilization signal $S_{FUS}$ associated with itself, other network nodes, or with itself and the other network nodes.

In a tenth possible implementation form of the network node according to the first aspect or in a second possible implementation form of the user device according to the second aspect, the communication preference information comprises one or more in the group comprising: at least one preferred frequency spectrum segment, at least one preferred network node, and at least one preferred frequency spectrum segment and at least one preferred network node.

Mentioned implementation forms enable the user device to assist the radio network to associate the user device to network nodes or frequency spectrum segments based on user device specific assistance information.

In a third possible implementation form of the user device according to the second aspect, the processor is further configured to determine the at least one preferred frequency spectrum segment s* or at least one preferred network node n* by satisfying one of the following criteria:

$$(n^*, s^*) = \arg\max_{n \in \mathcal{N}, s \in \mathcal{S}_{(n)}} \left( \alpha \frac{W_n^s c_n^s}{\lambda_n^s} - (1-\alpha) E_n^s \right), \text{ with } \alpha \in [0, 1],$$

$$(n^*, s^*) = \arg\max_{n \in \mathcal{N}, s \in \mathcal{S}_{(n)}} \left( \alpha \frac{c_n^s}{\lambda_n^s} - (1-\alpha) E_n^s \right), \text{ with } \alpha \in [0, 1],$$

$$(n^*, s^*) = \arg\max_{n \in \mathcal{N}, s \in \mathcal{S}_{(n)}} \left( \alpha \frac{W_n^s}{\lambda_n^s} - (1-\alpha) E_n^s \right), \text{ with } \alpha \in [0, 1],$$

where $\lambda_n^s$ is the utilization of a frequency spectrum segment s available at network node n, $c_n^s$ is an estimate of the spectral efficiency provided by network node n in frequency spectrum segment s, $E_n^s$ is an indication of the energy cost for using frequency spectrum segment s at network node n; $\mathcal{N}$ is a set of network nodes associated with frequency spectrum utilization signals $S_{FUS}$ received by the user device; and $\mathcal{S}(n)$ is the set of frequency spectrum segment s available at network node $n \in \mathcal{N}$.

The third possible implementation form enables a user device to make energy-aware selection of frequency spectrum segments preferred for communication with the network. The user device can further make a selection of frequency spectrum that trades off between energy cost and expected data rate, spectral efficiency, or available frequency resources.

In a fourth possible implementation form of the user device according to the second aspect, the transceiver is further configured to: receive a frequency assignment control signal $S_{FACS}$ comprising frequency assignment information for the user device. The processor is further configured to: use the frequency assignment information when communicating with at least one network node.

The fourth possible implementation form enables quick establishment of fast connection with a new network node or in a new frequency spectrum segment assigned to the user device for communication in the wireless communication system.

In a fifth possible implementation form of the user device according to the second aspect, the processor is further configured to: compute one or more estimates, associated with the at least one available frequency spectrum segment or the at least one network node, and use the one or more estimates when determining the communication preference information. The one or more estimates comprise one or more from the group comprising: achievable spectral efficiency, average achievable spectral efficiency, achievable data rate, average achievable data rate, achievable latency, average achievable latency, achievable maximum data rate, achievable minimum data rate, and average number of available frequency resources.

The fifth possible implementation form enables association of the user device to network nodes or frequency spectrum segments based on the mentioned estimates.

According to a third aspect of the invention, the above mentioned and other objectives are achieved by a method in a network node for a wireless communication system, the method comprising: transmitting a frequency utilization signal $S_{FUS}$ comprising frequency utilization information associated with at least one available frequency spectrum segment; receiving a communication preference signal $S_{CPS}$ associated with at least one user device, wherein the communication preference signal $S_{CPS}$ comprises communication preference information for the at least one user device; assigning, for the at least one user device, at least one frequency spectrum segment for communication in the wireless communication system based on the communication preference information.

In a first possible implementation form of the method according to the third aspect, the frequency utilization information comprises one or more in the group comprising: load information, frequency bandwidth information, utilization priority information, energy cost information, supportable traffic load information, supportable/admissible service type information, supportable/admissible traffic type information, and uplink or downlink carrier type information.

In a second possible implementation form of the method according to the third aspect, the step of assigning involves: determining, based on the communication preference information, frequency assignment information associated with the at least one frequency spectrum segment for the at least one user device; transmitting a frequency assignment control signal $S_{FACS}$ comprising the frequency assignment information to the at least one user device.

In a third possible implementation form of the method according to the second possible implementation form of the third aspect, the frequency assignment information comprises one or more in the group comprising: admission grant, admission denial, frequency address for the at least one frequency spectrum segment for communication, radio access technology, and network node identity.

In a fourth possible implementation form of the method according to the second or third possible implementation form of the third aspect, the method further comprises: receiving additional frequency assignment information associated with the at least one user device from other network nodes of the wireless communication system; transmitting the additional frequency assignment information to the at least one user device; or using the additional frequency assignment information for serving the at least one user device.

In a fifth possible implementation form of the method according to the third aspect, the frequency utilization signal $S_{FUS}$ is transmitted over a broadcast channel, or over a physical control channel, or over a higher layer Radio Resource Control, RRC, control channel of the wireless communication system.

In a sixth possible implementation form of the method according to the third aspect, the network node is an access node or a network control node.

In a seventh possible implementation form of the method according to the third aspect, the method further comprises: receiving additional frequency utilization information from other network nodes; using the additional frequency utilization information when assigning the at least one frequency spectrum segment.

In an eighth possible implementation form of the method according to the third aspect, the method further comprises: receiving the communication preference information for the at least one user device from at least another network node.

Alternatively or additionally, the CPI may be received directly from the user device.

According to a fourth aspect of the invention, the above mentioned and other objectives are achieved by a method in a user device for a wireless communication system, the method comprising: receiving a frequency utilization signal $S_{FUS}$ comprising frequency utilization information associated with at least one available frequency spectrum segment; determining, based on the frequency utilization information, communication preference information for the user device;

and transmitting a communication preference signal $S_{CPS}$ comprising the communication preference information to at least one network node.

In a ninth possible implementation form of the method according to the first aspect or in a first possible implementation form of the method according to the second aspect, the frequency utilization information is further associated with at least one network node of the wireless communication system.

In a tenth possible implementation form of the method according to the third aspect or in a second possible implementation form of the method according to the fourth aspect, the communication preference information comprises one or more in the group comprising: at least one preferred frequency spectrum segment, at least one preferred network node, and at least one preferred frequency spectrum segment and at least one preferred network node.

In a third possible implementation form of the method according to the fourth aspect, the at least one preferred frequency spectrum segment s* or at least one preferred network node n* are determined by satisfying one of the following criteria:

$$(n^*, s^*) = \text{argmax}_{n \in \mathcal{N}, s \in \mathcal{S}_{(n)}} \left( \alpha \frac{W_n^s c_n^s}{\lambda_n^s} - (1-\alpha) E_n^s \right), \text{ with } \alpha \in [0, 1],$$

$$(n^*, s^*) = \text{argmax}_{n \in \mathcal{N}, s \in \mathcal{S}_{(n)}} \left( \alpha \frac{c_n^s}{\lambda_n^s} - (1-\alpha) E_n^s \right), \text{ with } \alpha \in [0, 1],$$

$$(n^*, s^*) = \text{argmax}_{n \in \mathcal{N}, s \in \mathcal{S}_{(n)}} \left( \alpha \frac{W_n^s}{\lambda_n^s} - (1-\alpha) E_n^s \right), \text{ with } \alpha \in [0, 1],$$

where $\lambda_n^s$ is the utilization of a frequency spectrum segment s available at network node n, $c_n^s$ is an estimate of the spectral efficiency provided by network node n in frequency spectrum segment s, $E_n^s$ is an indication of the energy cost for using frequency spectrum segment s at network node n; $\mathcal{N}$ is a set of network nodes associated with frequency spectrum utilization signals $S_{FUS}$ received by the user device (30); and $\mathcal{S}(n)$ is the set of frequency spectrum segment s available at network node $n \in \mathcal{N}$.

In a fourth possible implementation form of the method according to the fourth aspect, the method further comprises: receiving a frequency assignment control signal $S_{FACS}$ comprising frequency assignment information for the user device; using the frequency assignment information when communicating with at least one network node.

In a fifth possible implementation form of the method according to the fourth aspect, the method further comprises: computing one or more estimates, associated with the at least one available frequency spectrum segment or the at least one network node, and using the one or more estimates when determining the communication preference information. The one or more estimates comprise one or more from the group comprising: achievable spectral efficiency, average achievable spectral efficiency, achievable data rate, average achievable data rate, achievable latency, average achievable latency, achievable maximum data rate, achievable minimum data rate, and average number of available frequency resources.

The advantages of the methods in a network node and in a user device are the same as those for the corresponding device claims.

It is further noted that the present invention also relates to a wireless communication system comprising at least one network node and at least one user device according to embodiments of the present invention. Further, a corresponding method in a wireless communication system comprises the method in the network node and the method in the user device.

The present invention also relates to a computer program, characterized in code means, which when run by processing means causes said processing means to execute any method according to an embodiment of the present invention. Further, the invention also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Embodiments of the present invention enable network nodes to control and optimize the traffic load balance among the available frequency spectrum segments by exploiting communication preference signals from user devices.

User devices, on the other hand, are enabled to select at least a preferred frequency spectrum segments and/or a network node for communicating/joining the radio communication network based on at least a frequency utilization signal received from the radio network.

Another advantage of embodiments of the present invention is to enable a user device to determine and signal a preference of frequency spectrum segments and/or network nodes to fulfil its traffic or service requirements.

Yet another advantage of embodiments of the present invention is to enable user devices to trigger handover to frequency spectrum segments (or network nodes) that can assure a better service (e.g., less utilized).

Yet another advantage of embodiments of the present invention is to enable network nodes to balance the traffic load in the available frequency spectrum segments based on spectrum preference signalled by user devices.

Yet another advantage of embodiments of the present invention is to enable network nodes to incrementally activate more spectrum segments based on the user device requirements and preferences or traffic load.

Yet another advantage of embodiments of the present invention is to enable network nodes to save energy by controlling and optimizing the utilization of frequency spectrum segments based on requirements/preference of user devices as well as on the traffic demand and energy costs for activating and utilizing a frequency spectrum segment.

Further applications and advantages of embodiments of the present invention will be apparent from the following detailed description.

BRIEF DESCRIPTION OF THE DRAWINGS

The appended drawings are intended to clarify and explain different embodiments of the present invention, in which.

DETAILED DESCRIPTION OF ILLUSTRATIVE EMBODIMENTS

In conventional solutions, a user device, such as a user equipment (UE) in LTE, assists the radio network in cell-association, handover and load balancing procedures by providing feedback related to the received signal strength from multiple network nodes of a radio communication network. This, however, is insufficient to assure that the user device is connected or handed over to a network node with the potential to offer the required service.

Further, when a network node in a radio communication system can be configured to operate in multiple frequency spectrum bands, portions of frequency bands, and/or with multiple radio access technologies available, it is a problem to determine which frequency spectrum band and/or which radio access technology to use so as to comply with users' traffic/service demands, balance the traffic among frequency spectrum band and minimize network's energy costs.

Therefore, embodiments of the present invention relate to a network node, a user device and methods thereof.

Figure 1:
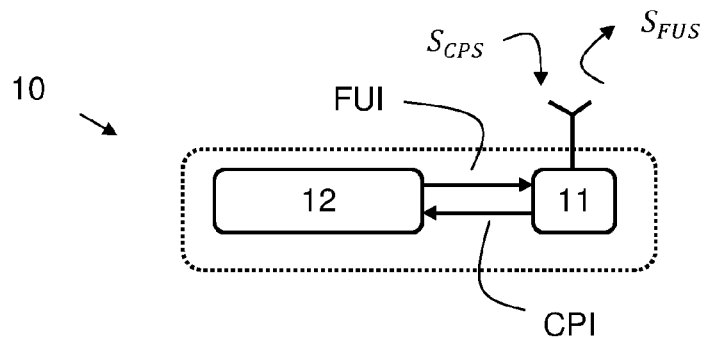
FIG. 1 shows a network node according to an embodiment of the present invention.

A network node according to an embodiment of the present invention is shown in FIG. 1. The network node 10 comprises a transceiver 11 and a processor 12 which are communicably coupled to each other. The transceiver 11 is configured to transmit a frequency utilization signal $S_{FUS}$ comprising frequency utilization information FUI associated with at least one available frequency spectrum segment of a wireless communication system. As an example, the FUI may indicate how loaded a (or a plurality of) given frequency spectrum segment(s) currently is (are) or could indicate which frequency spectrum segments still have resources available.

The transceiver 11 is further configured to receive a communication preference signal $S_{CPS}$ associated with at least one user device, wherein the communication preference signal $S_{CPS}$ comprises communication preference information CPI for the at least one user device 30. The processor 12 is configured to assign, for the at least one user device 30, at least one frequency spectrum segment for communication in the wireless communication system based on the communication preference information CPI.

Figure 2:
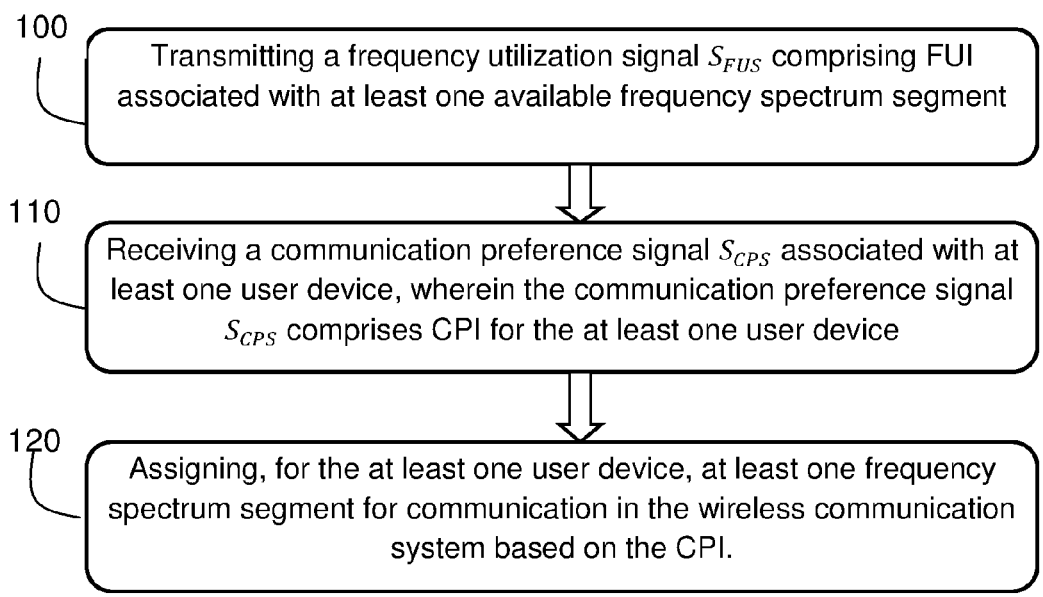
FIG. 2 shows a flow chart of a method in a network node according to an embodiment of the present invention.

Furthermore, it is disclosed a corresponding method in a network node as shown in the flow chart of FIG. 2. The method in the network node 10 comprises: transmitting 100 a frequency utilization signal $S_{FUS}$ comprising frequency utilization information FUI associated with at least one available frequency spectrum segment; receiving no a communication preference signal $S_{CPS}$ associated with at least one user device 30, wherein the communication preference signal $S_{CPS}$ comprises communication preference information CPI for the at least one user device 30. Furthermore, the method comprises assigning 120, for the at least one user device 30, at least one frequency spectrum segment for communication in the wireless communication system based on the communication preference information CPI.

Figure 3:
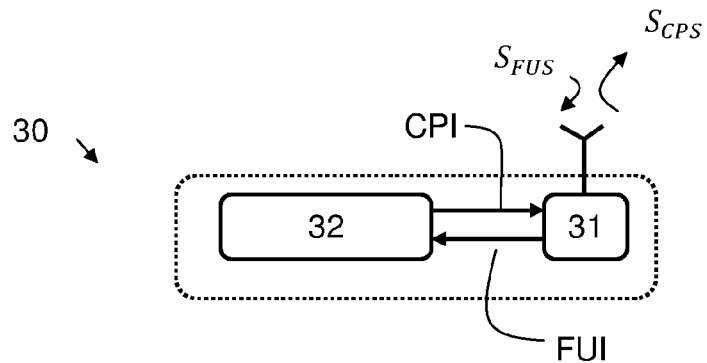
FIG. 3 shows a user device according to an embodiment of the present invention.

Moreover, FIG. 3 shows a user device 30 according to a further embodiment of the present invention. The user device 30 comprises a transceiver 31 and a processor 32 which are communicably coupled to each other. The transceiver 31 is configured to receive a frequency utilization signal $S_{FUS}$ comprising frequency utilization information FUI associated with at least one available frequency spectrum segment. The processor 32 is configured to determine, based on the frequency utilization information FUI, communication preference information CPI for the user device 30. The transceiver 31 is further configured to transmit a communication preference signal $S_{CPS}$ comprising the communication preference information CPI to at least one network node 10.

Figure 4:
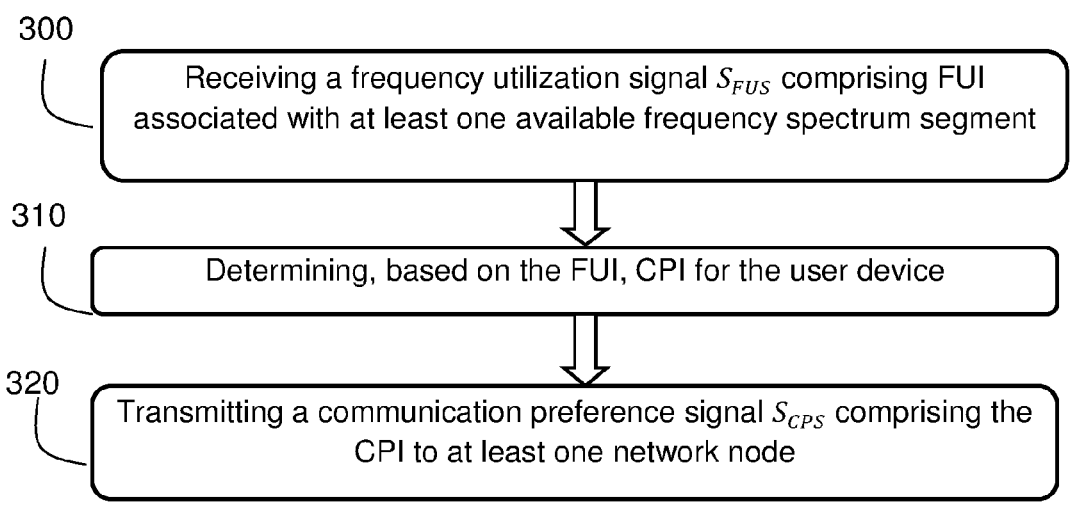
FIG. 4 shows a flow chart of a method in a user device according to an embodiment of the present invention.

Furthermore, it is disclosed a corresponding method in a user device 30 as shown in the flow chart of FIG. 4. The method in the user device 30 comprises: receiving 300 a frequency utilization signal $S_{FUS}$ comprising frequency utilization information FUI associated with at least one available frequency spectrum segment; determining 310, based on the frequency utilization information FUI, communication preference information CPI for the user device 30; and transmitting 320 a communication preference signal $S_{CPS}$ comprising the communication preference information CPI to at least one network node 20.

Figure 5:
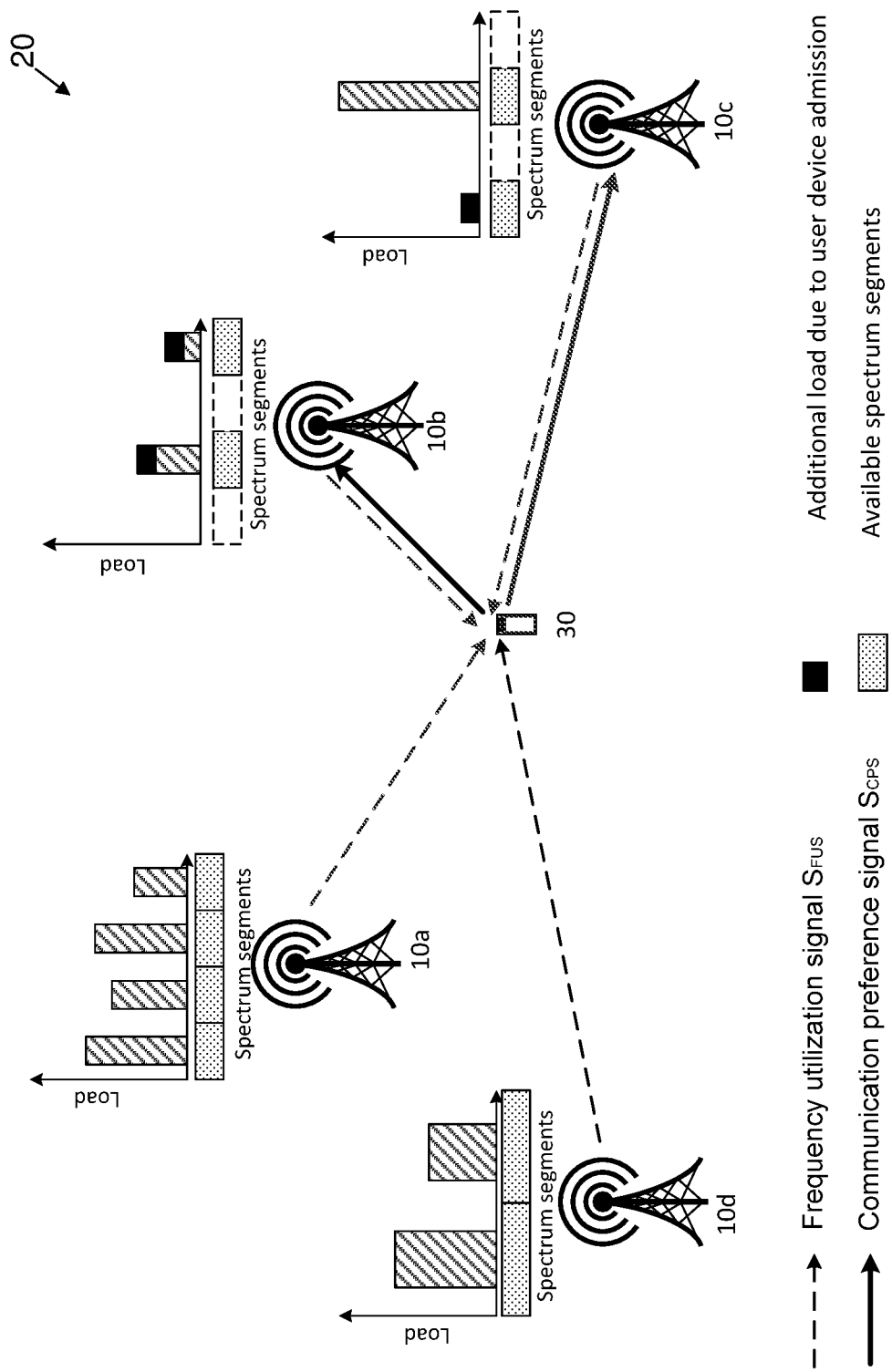
FIG. 5 illustrates a wireless communication system comprising embodiments of the present invention.

FIG. 5 illustrates an example of proposed network nodes (or network node devices) 10a, 10b, 10c, 10d and user device 30 in a wireless communication system 20. A user device 30 receives frequency utilization signals $S_{FUS}$ from the four network nodes 10a, 10b, 10c, 10d, based on which the user device 30 determines communication preference information CPI relating to at least a frequency spectrum segment or at least a network node the user device 30 prefers for communication in the wireless communication system (20).

The user device 30 may thereafter transmit a communication preference signal to the preferred network nodes, in this case to network nodes 10b and 10c which will serve the user device 30. The additional load associated with the user device 30 at the network nodes 10b, 10c which will serve user device 30 is illustrated with black for network nodes 10b and 10c.

Figure 6:
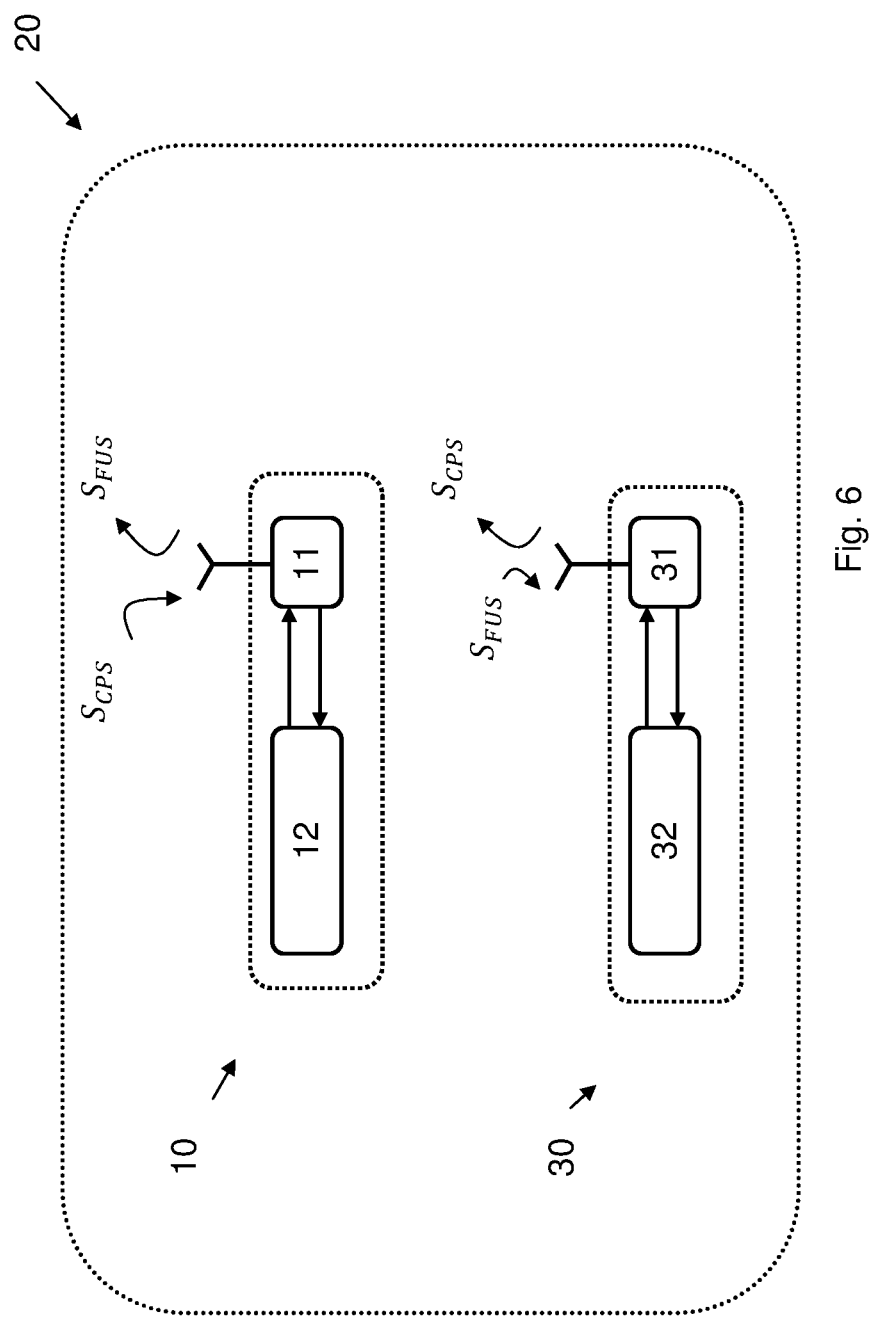
FIG. 6 illustrates signalling between a user device and a network node.

FIG. 6 shows basic signalling aspects involved in an embodiment of the method in the wireless communication system. It is shown in FIG. 6 how a network node 10 transmits a frequency utilization signal $S_{FUS}$ in a wireless communication system 20 which is received by a user device 30. The user device 30 determines communication preference information CPI, based on the frequency utilization information FUI, and transmits the communication preference information CPI comprised in a communication preference signal $S_{CPS}$ to the network node 10 in this example.

In one embodiment of the present invention, the frequency utilization information FUI is further associated with at least one network node 10a, 10b, . . . , 10n of the wireless communication system. As an example, the FUI may not only indicate the current load of certain frequency spectrum but also the current load of a certain network node 10a, 10b, . . . 10n for a given frequency spectrum segment. Thereby, both frequency spectrum segment(s) and network node(s) can be considered by the user device 30.

In an embodiment of the present invention, the spectrum utilization signal $S_{FUS}$ transmitted by the network node 10 to the user device 30 comprises information associated to one or more in the group comprising:

Load (utilization) information of at least one frequency spectrum segment available at the network node and/or at other network nodes of the network;

Frequency bandwidth information of the at least an available spectrum segment;

Utilization priority information associated with the at least one frequency spectrum segment available at the network node and/or at other network nodes;

Energy cost information associated with (the utilization of) the at least one frequency spectrum segment available at the network node and/or at other network nodes;

Supportable (additional) traffic load (e.g., nominal capacity) information of at least one frequency spectrum segment available at the network node and/or at other network nodes;

Supportable and/or admissible service type information in the at least one frequency spectrum segment available at the network node and/or at other network nodes;

Network node identifier information.

The load of an available frequency spectrum segment may be indicated as an estimate of the (average/minimum/maximum) traffic load; an estimate of the (average/minimum/maximum) number of user devices 30 admitted to the spectrum segment; an estimate of the (average/minimum/maximum) number of user devices 30 admitted to the at least a spectrum segment and actively scheduled for communication. In addition the load of the available frequency spectrum segment may include an indication of the load variance.

An estimate of the average offered load or traffic intensity at a frame level is the product of the average frame arrival rate and the frame processing and transmission time, and at service level is the product of the average service request arrival rate (or user arrival rate) and the average service time. This information enables a user device 30 to estimate the average per-user spectral efficiency offered in a certain frequency spectrum segment by a network node. By additionally indicating the frequency bandwidth, a user device 30 is enabled to estimate the average data throughput achievable in a certain frequency spectrum segment.

A network node 10 may indicate a preference to utilize and/or activate an available frequency spectrum segment by signalling a priority associated to the frequency spectrum segment. For instance, frequency spectrum segments indicated with higher (or lower) utilization priority should be prioritized. In addition, the network node 10 may transmit an indication of the energy cost associated to the utilization of an available frequency spectrum segment, including: the (average/maximum/minimum) transmission power associated to the spectrum segment; an estimate of the running cost of the spectrum segment; an estimate of the running cost of the spectrum segment normalized with respect to its load. This information has the benefit to enable spectrum communication preference signals CPIs from user devices 30 that account for the preference of spectrum utilization at the network node 10 and the energy consumption, respectively.

Additionally, a network node 10 may transmit an indication of the service types associated with at least one available frequency spectrum segment, i.e., the types of service supported by and/or admissible in an available frequency spectrum segment. The benefit of this is to allow the network node to bundle different traffic services to different spectrum segments. For instance, this would enable a network operator to direct all user devices 30 with a certain type of traffic (e.g., voice, video, etc.) to be served by specific frequency spectrum segments.

In an embodiment of the invention, the spectrum utilization signal $S_{FUS}$ transmitted by a network node 10 may further comprise an indication of an estimate of load/utilization variance for the at least one spectrum segment. It is to be understood that this utilization variance should be taken into account by the user device when it determines the preferred frequency spectrum segments. For instance, by combining the average load/utilization and its variance, a user device 30 can estimate a minimum (worst case scenario) and a maximum (best case scenario) average data rate achievable in a frequency spectrum segment. In alternative, a user device 30 could be discouraged to issuing new communication preference signals $S_{CPS}$ as long as the utilization variance is within the interval communicated by the network. The advantage of this method is to reduce the number of communication preference signals $S_{CPS}$ from the user device to the network.

In an embodiment of the invention, the frequency utilization signal $S_{FUS}$ transmitted by a network node 10 may indicate whether at least one frequency spectrum segment available at the network node and/or at other network nodes is used for uplink communication or downlink communication. In other words, a frequency utilization signal $S_{FUS}$ can be associated with at least one uplink frequency carrier and/or with at least a downlink frequency carrier or a portion thereof.

Thus, in one example, separate frequency utilization signals $S_{FUS}$ are associated with frequency spectrum segments used for downlink and uplink operation in the system. In combination with other embodiments, a spectrum utilization signal may carry information associated with uplink and/or downlink operation with respect to the at least one frequency spectrum segment available at the network node, such as an indication of the load/utilization, an indication of the bandwidth, and indication of an energy cost, and indication of a priority of utilization, etc. This is beneficial in Time Division Duplex communication systems, where a frequency carrier (e.g., frequency spectrum segment) is time-shared for uplink and downlink traffic, and for Frequency Division Duplex communication systems where separate frequency carriers are used for uplink and downlink.

In an embodiment of the invention, a first network node transmits an additional spectrum utilization signal comprising information associated with at least one other second network node. An example for this feature of a network node will be given in the following.

Figure 7:
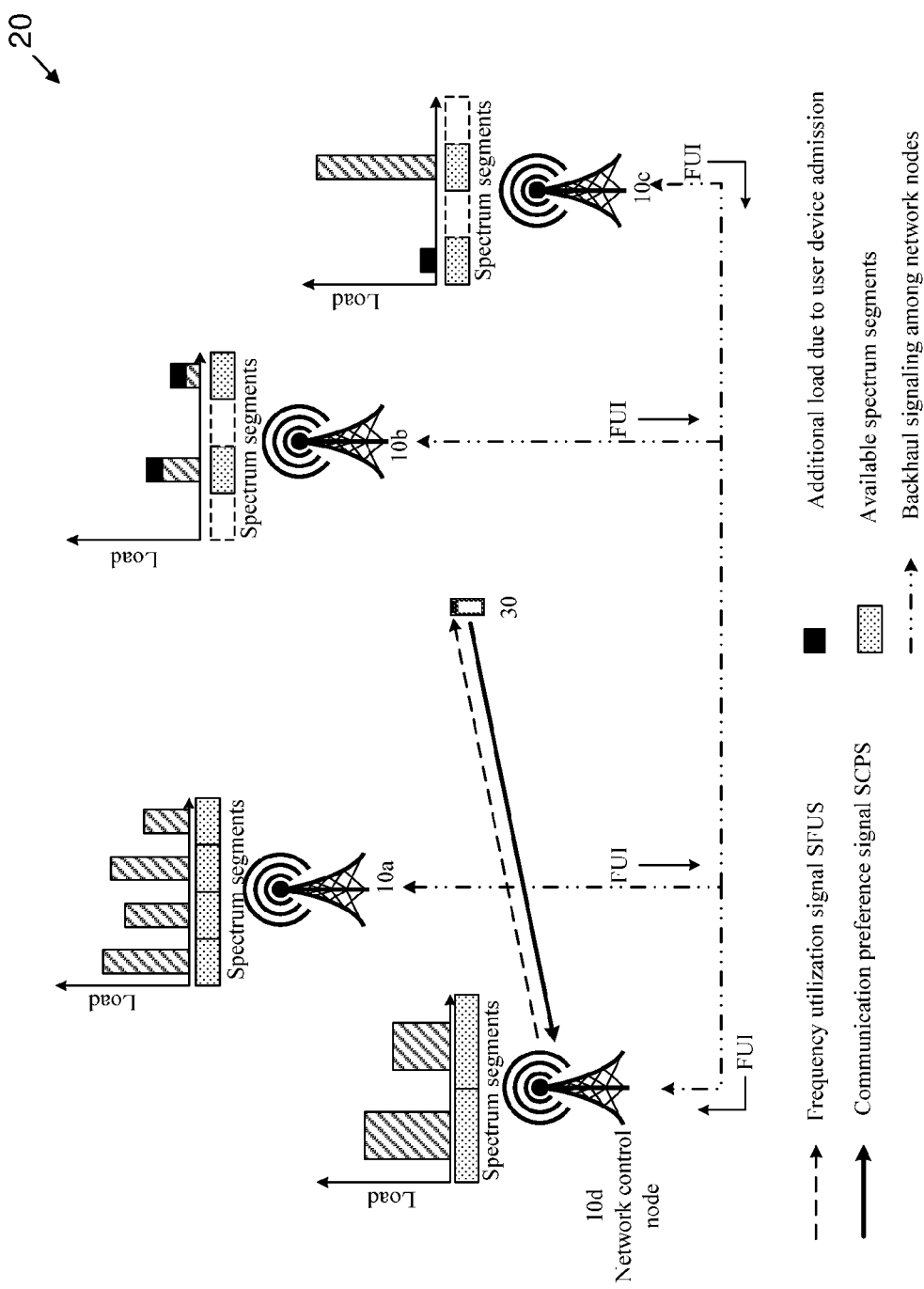
FIG. 7 illustrates a further wireless communication system comprising embodiments of the present invention.

FIG. 7 illustrates an example where the first network node is a network control node 10d overseeing the operation of a group of other network nodes 10a, 10b, 10c. Furthermore, the network control node 10d is configured to receive frequency utilisation information from the other network nodes 10a, 10b, 10c of the communication system 20. The network control node 10d transmits a frequency utilisation signal to the user device 30, and receives a communication preference signal in response from the user device 30. The network control node 10d may thereafter instruct (e.g. using backhaul channels) other network nodes 10b and 10c to serve the user device 30. The additional load associated with the user device 30 is illustrated with black for network nodes 10b and 10c. The network control node 10d may be a network node of a radio access network infrastructure, such as an eNodeB of a heterogeneous LTE system, as in FIG. 7, or a node in the core network of the system 20.

Therefore, the frequency utilization signal may carry information associated with one or more network nodes and the respective available frequency spectrum segments as described in related embodiments. The frequency utilization information FUI may be exchanged through a dedicated interface for communication among network nodes, e.g., X2 interface in the related art LTE system, or a new type of interface suitable in this respect. An advantage of this method is to reduce the amount of signalling overhead and enable a more centralized control of the admission of user device to frequency spectrum segment. It further enables to optimize the traffic balancing among multiple network nodes and the respective available frequency spectrum segments through a centralized control.

In one embodiment of the invention, the processor 12 of the network node 10 is further configured to determine, based on the communication preference information CPI, frequency assignment information FAI associated with the at least one frequency spectrum segment for the user device 30. Moreover the transceiver 11 is further configured to transmit a frequency assignment control signal $S_{FACS}$ comprising the frequency assignment information FAI to the user device 30.

The frequency assignment information FAI may indicate information associated to frequency spectrum segments to be used for further communication by the user device, and may comprise one or more in the group of: admission grant for at least a spectrum segment available at a network node; admission denial for at least a spectrum segment available at a network node; frequency spectrum segment address to which the user device is admitted; the RAT associated to frequency spectrum segments assigned to the user device; and network node identity.

An admission grant/denial can be associated to a specific frequency spectrum segment (e.g., a component carrier and/or RAT) or to a group of frequency spectrum segments (e.g., multiple component carriers and/or RATs). An admission grant/denial can further be associated to uplink and/or downlink operation. In addition, an admission grand/denial can be addressed to a specific user device or to a group of user devices.

Figure 8B:
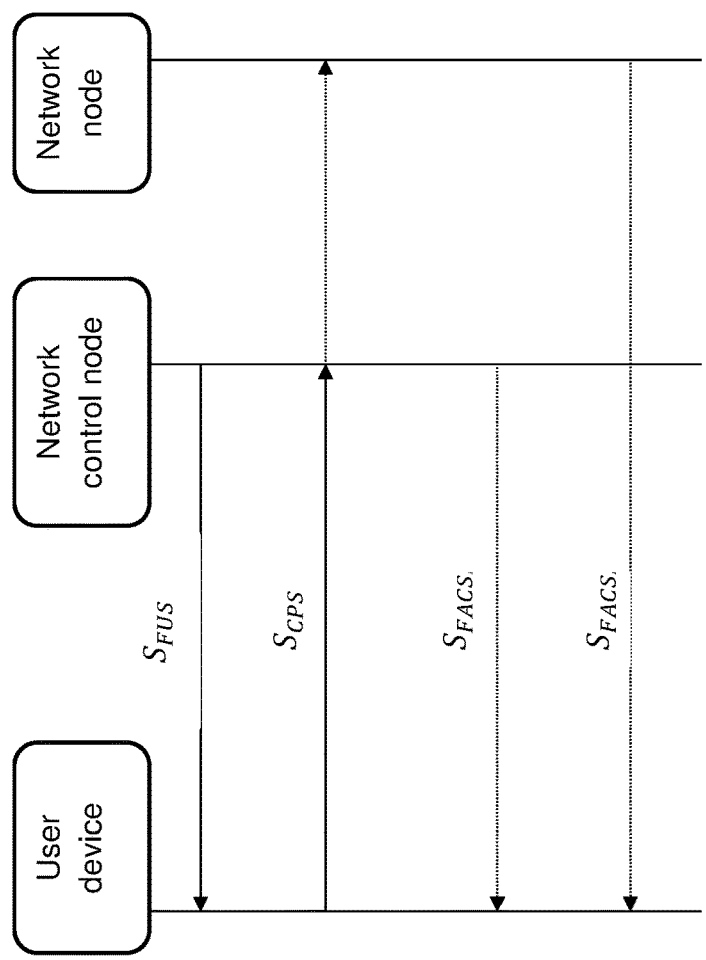
FIG. 8(a) and FIG. 8(b) are a show signaling between a user device, a network node, and a network control node.
Figure 8A:
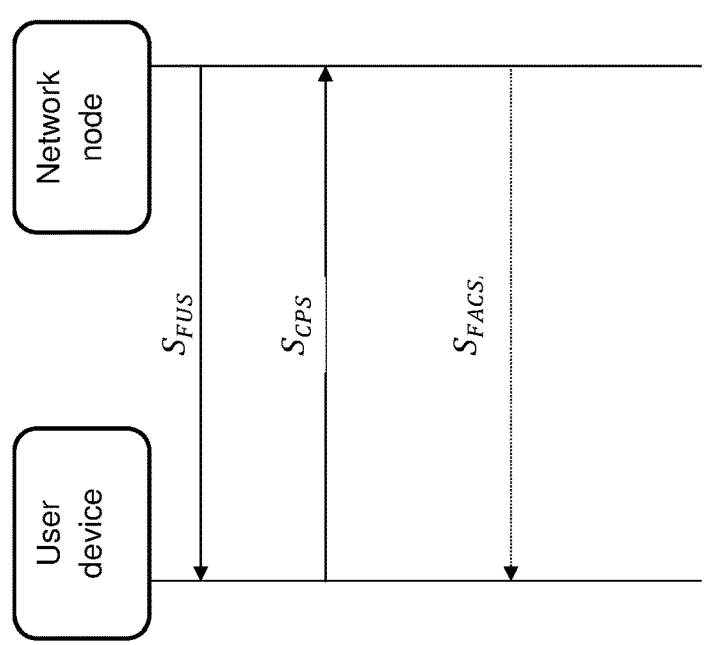

The basic signalling steps that include transmission of a frequency assignment control signal $S_{FACS}$ are illustrated in FIG. 8(*a*) and FIG. 8(*b*) for two cases: (a) absence of a network control node; (b) presence of a network control node.

In the absence of a network control node (FIG. 8 (*a*)), a network node signals a frequency utilization signal $S_{FUS}$ and eventually a frequency assignment control signal $S_{FACS}$ to the user device in response to a communication preference signal $S_{CPS}$ from the user device 30. In the presence of a network control node (FIG. 8b), both the spectrum utilization signal $S_{FUS}$ and the frequency assignment control signal $S_{FACS}$ may be signalled by the network control node.

Figure 9:
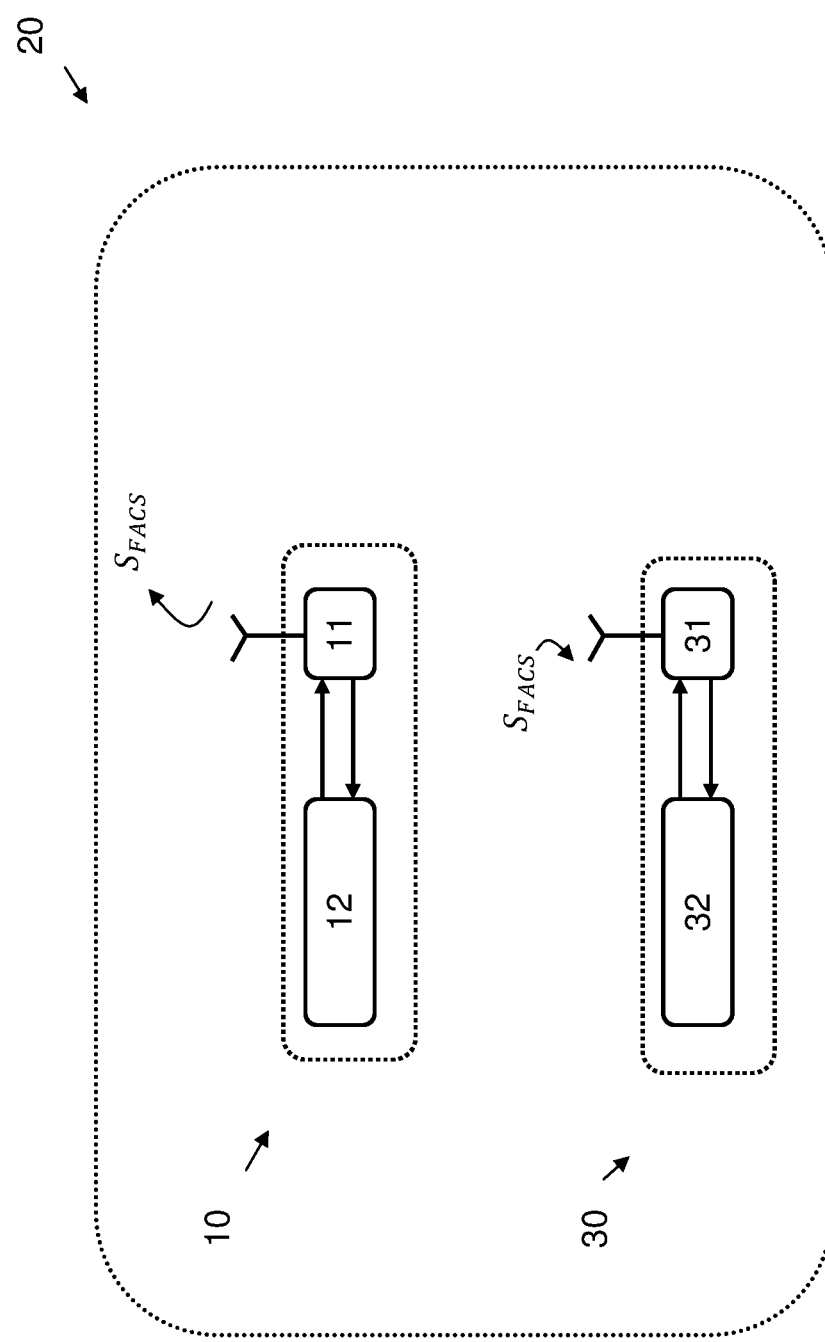
FIG. 9 illustrates signaling between a user device and a network node.

The basic signalling steps that include transmission of the frequency assignment control signal $S_{FACS}$ are also illustrated in FIG. 9. The network node 10 transmits the frequency assignment control signal $S_{FACS}$ comprising the frequency assignment information FAI to the user device 30. After reception of the frequency assignment control signal $S_{FACS}$ and processing of the frequency assignment information FAI the user device 30 can communicate according to the frequency assignment information FAI with the radio network.

Figure 10:
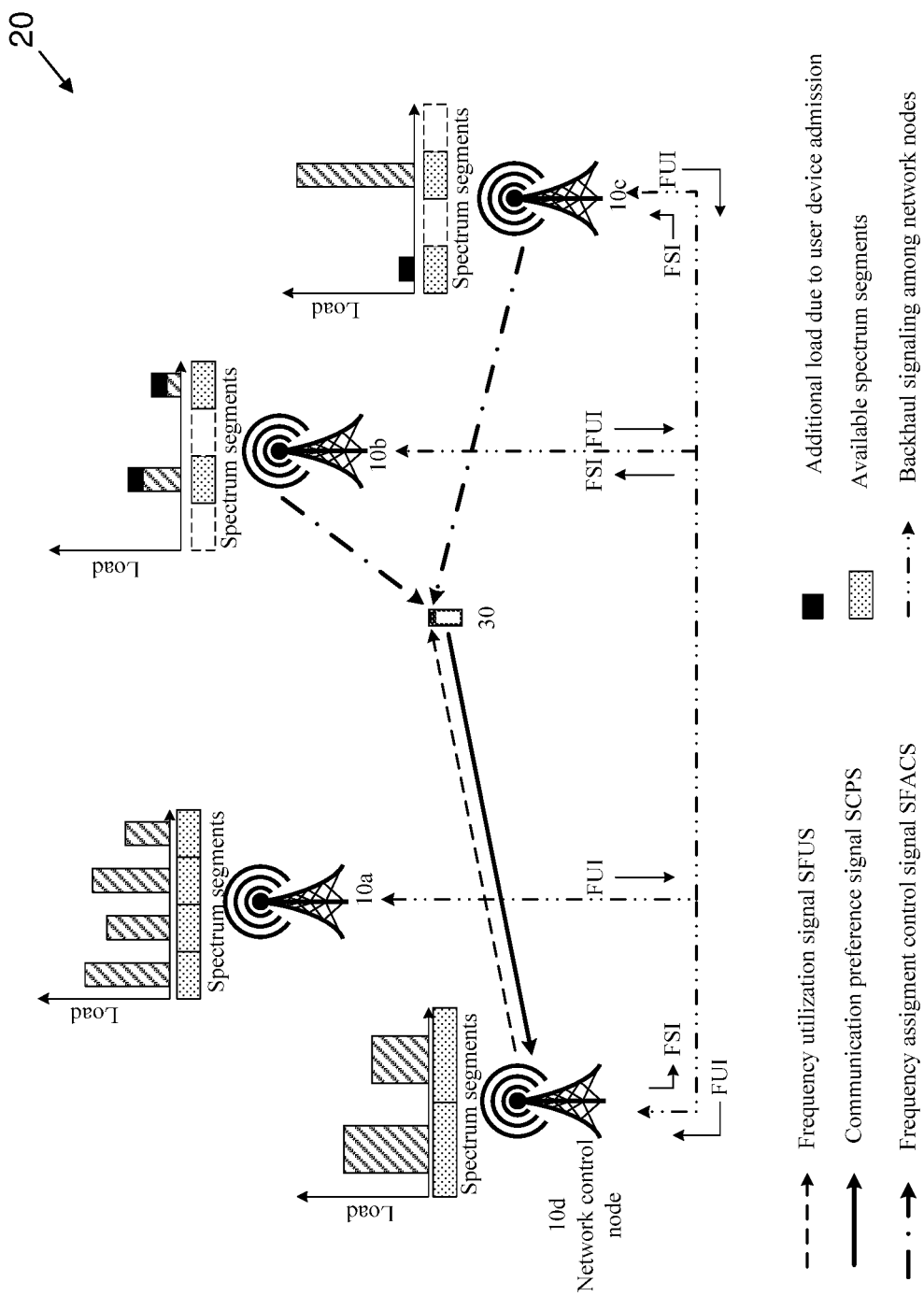
FIG. 10 illustrates yet another embodiment of the present invention in a wireless communication system.

In alternative, the frequency assignment control signal $S_{FACS}$ may be signalled by the network nodes to which the user device 30 is associated to, as exemplified in FIG. 10. The first network node is in this example a network control node 10d overseeing the operation of a group of other network nodes 10a, 10b, 10c and receiving frequency utilisation information FUI from the other network nodes 10a, 10b, 10c. The network control node 10d transmits a frequency utilisation signal to the user device 30, and receives a communication preference signal in response from the user device 30. The network control node 10d determines the assignment of frequency spectrum segments and/or network nodes 10a, 10b, 10c for the user device 30, while the assigned network nodes 10b, 10c transmit the frequency assignment control signal $S_{FACS}$ to the user device 30. A benefit of this method is to enable a fast admission control to user devices for spectrum segments and/or network nodes for inter-frequency load balancing/offloading and handover.

In an embodiment of the invention, a network node 10 transmits an indication of the utilization of the available frequency spectrum segments for a subset of the available frequency spectrum segments to the user device 30. In an alternative, a reserved value of the spectrum utilization signal is associated to a frequency spectrum segment that the network node does not desire to make available for communication. As user devices would attempt to access frequency spectrum segments with low utilization (as they provide the higher average data throughput), this method enables to control the utilization of the available frequency spectrum by letting a network node incrementally activate (i.e., make available) more frequency spectrum segments as the traffic demand and/or the network load increases, and less frequency spectrum when the demand decreases. Additionally, energy savings are enabled by activating the frequency spectrum segments strictly necessary to sustain the traffic and/or service demand in the network.

In an embodiment of the invention, the frequency utilization signal $S_{FUS}$ is transmitted as part of a broadcast channel. Since the information associated to the spectrum utilization may change slowly compared to the frequency of transmission of a system broadcast channel, the broadcast transmission carrying frequency utilization information FUI may have longer repetition period than the repetition period of existing broadcast transmissions in the system. One benefit of broadcasting a frequency utilization signal $S_{FUS}$ is that all the potential system users are able to receive it regardless of whether they have a connection already established with the system or not.

In an embodiment of the invention, the frequency utilization signal $S_{FUS}$ is transmitted as part of a physical control channel. The transmission may occur as part of a common control channel, i.e. being transmitted in a common search space, or in a user-specific control channel. The advantage is to enable a network node to indicate changes in the spectrum utilization to a particular group of user devices or a single user device.

In an embodiment of the invention, the frequency utilization signal $S_{FUS}$ is sent by the network node 10 periodically or non-periodically whenever spectrum segment load balance significantly changes. The period interval can be determined as a function of the traffic load. In addition, the transmission of spectrum utilization signal can be triggered when the variation of traffic load/utilization exceeds a certain threshold or exceeds a certain threshold for a period of time.

In an embodiment of the invention, a user device m (such as the user device 30 shown in the preceding figures) further estimates an indication of the spectral efficiency $c_{m,n}^{s}$ achievable in at least one frequency spectrum segment s available at a network node n, and uses the estimate for determining at least one frequency spectrum segment preferred for communication.

The benefit of this additional step is to enable the user device m to account for the spectral efficiency and/or achievable data rate when determining at least one frequency spectrum segment preferred for communication. Measurements of signal strength of reference signals transmitted by network node n in a spectrum segment s can be helpful to determine the spectral efficiency $c_{m,n}^s$. For instance, the achievable spectral efficiency can be estimated as $c_{m,n}^s = \log_2(1+\text{SINR}_{m,n}^s)$ where $\text{SINR}_{m,n}^s$ is an estimate of the (average) signal to noise plus interference ratio measured by the user device m in spectrum segment s of the network node n by taking into account measurements of received power from multiple network nodes. In alternative, a user device may use reference signal received power (RSRP) to estimate signal to noise ratio (SNR) instead of signal to noise and interference ratio (SINR). The benefit of this is that the user device m may straightforwardly obtain a rough estimate for each network node. When reference signals are not transmitted (or transmitted sporadically) in some frequency spectrum segments available at a network node, the mobile node (the user device) may assume the same spectral efficiency estimated for other frequency spectrum segments of the same network node, thus $c_{m,n}^s = c_{m,n}^{\hat{s}}$ where ŝ is a frequency spectrum segment of network node n where an estimate $c_{m,n}^{\hat{s}}$ is available at the user device. Thus, in one example, the user device m estimates the achievable spectral efficiency in a single frequency spectrum segment available at a network node n (and uses this estimate of the spectral efficiency also for other frequency spectrum segments available at the network node).

In an embodiment of the invention, the user device m computes for at least one frequency spectrum segment s and the associated network node n preferred for communication one or more estimates based on one or more criteria (performance indicators) in the group of: achievable spectral efficiency; average achievable spectral efficiency; achievable data rate; average achievable data rate; achievable latency; average achievable latency; achievable maximum data rate; achievable minimum data rate; and average number of available frequency resources.

In other words, the user device m is capable of determining at least one frequency spectrum segment s and the associated network node n preferred for communication by comparing the aforementioned performance indicators with respect to different network nodes or spectrum segments and selecting the pair (n*,s*) satisfying one of the following criteria:

$$(n^*, s^*) = \arg \max_{n \in \mathcal{N}(m), s \in \mathcal{S}(n)} (W_n^s c_{m,n}^s / \lambda_n^s), \quad (1)$$

$$(n^*, s^*) = \arg \max_{n \in \mathcal{N}(m), s \in \mathcal{S}(n)} (c_{m,n}^s / \lambda_n^s), \quad (2)$$

$$(n^*, s^*) = \arg \max_{n \in \mathcal{N}(m), s \in \mathcal{S}(n)} (W_n^s / \lambda_n^s), \quad (3)$$

where $W_n^s$ represents the size of spectrum segment s available at network node n, $\lambda_n^s$ the corresponding utilization indicated by network node n (e.g., traffic load, average/minimum/maximum number of user devices scheduled, etc), while $c_{m,n}^s$ is a estimate of the spectral efficiency provided by network node n in spectrum segment s for user device m. Furthermore, $\mathcal{N}(m)$ is a set of network nodes relevant for user device m, while $\mathcal{S}(n)$ is the set of frequency spectrum segments s available at network node $n \in \mathcal{N}(m)$. Therefore, the quantity $W_n^s c_{m,n}^s / \lambda_n^s$ represents an estimate of the (average/maximum/minimum) data throughput achievable by the user device in spectrum segment s at network node n. The quantity $c_{m,n}^s / \lambda_n^s$ represents an estimate of the (average/maximum/minimum) spectral efficiency achievable by the user device in spectrum segment s at network node n. The quantity $W_n^s / \lambda_n^s$ represents an estimate of the (average/maximum/minimum) number of frequency resources obtainable by the user device in spectrum segment s at network node n.

The sets $\mathcal{N}(m)$ and $\mathcal{S}(n)$ are known at user device m. In one example, the user device is configured by the network with a set $\mathcal{N}(m)$ of network nodes to monitor. In another example, the set $\mathcal{N}(m)$ comprises network nodes discovered by the user devices upon receiving and decoding downlink reference signals and/or at least a frequency spectrum utilization signal. The set $\mathcal{S}(n)$ can be signalled to the user device 30 to the network in several ways according to previous embodiments.

It is further disclosed herein that Eq. (1) solves the following integer linear program (ILP) problem $$\text{maximize} \sum_{n \in \mathcal{N}(m)} \sum_{s \in \mathcal{S}(n)} x_{m,n}^s \frac{W_n^s c_{m,n}^s}{\lambda_n^s} \quad (4)$$

$$\text{subject to} \sum_{n \in \mathcal{N}(m)} \sum_{s \in \mathcal{S}(n)} x_{m,n}^s \leq K_m$$

$$x_{m,n}^s \in \{0, 1\} \ \forall n \in \mathcal{N}(m), s \in \mathcal{S}(n).,$$

where the decision variable $x_{m,n}^s \in \{0,1\}$ is equal to one if user device m selects spectrum segment s at the network node n, zero otherwise, and the inequality constraint states that the user device 30 can request to be admitted to access up to $K_m$ spectrum segments.

It is realized that by replacing the term $$\frac{W_n^s c_{m,n}^s}{\lambda_n^s}$$

in the objective function with a continuous, monotonic function of $$\frac{W_n^s c_{m,n}^s}{\lambda_n^s},$$

e.g.

$$u_{m,n}^s = \log \frac{W_n^s c_{m,n}^s}{\lambda_n^s},$$

shall yield the same result. Without imposing any requirement on the minimum and maximum average data throughput as in problem (4), the user device 30 is enabled to freely select up to $K_m$ spectrum segments.

By adding a constraint $$r_{m,min} \leq \sum_{n \in \mathcal{N}(m)} \sum_{s \in \mathcal{S}(n)} x_{m,n}^s \frac{W_n^s c_{m,n}^s}{\lambda_n^s} \leq r_{m,max}$$

to the problem (4) providing a lower and an upper bound to the aggregate average data throughput of the user device over the selected spectrum segments, the number $k \in [1, K_m]$ of spectrum segments desired by the user device is determined so as to aggregate average data rate in within the range $[r_{m,min}, r_{m,max}]$.

Thus, a benefit of this is to enable the user device 30 to determine the desired frequency spectrum segment(s) and the associated network node(s) to be admitted/connected to so as to optimize its average data throughput. In addition, through the knowledge of the utilization $\lambda_n^s$ of spectrum segments indicated by the network nodes, user devices are enabled to request admission to spectrum segments with lower utilization, thereby balancing the inter-frequency load at the network nodes.

It should be recognized that equations (2) and (7) can be used to solve similar problems with similar consideration, where the corresponding problem can be formulated by replacing the objective function in (4) accordingly. For example, the aspect of latency can also be considered in the present invention. For real-time services or delay-intolerant type of traffic, the user device 30 can select a frequency spectrum segment and/or a network node that provide the least latency. In this way the user device 30 assists the radio network to provide the required service with minimum delay.

In an embodiment of the invention, a user device m determines at least one frequency spectrum segment s or the associated network node n preferred for communication as the pair (n*, s*) satisfying one of the following criteria $$(n^*, s^*) = \text{argmax}_{n \in \mathcal{N}, s \in \mathcal{S}(n)} \left( \alpha \frac{W_n^s c_n^s}{\lambda_n^s} - (1-\alpha) E_n^s \right), \text{ with } \alpha \in [0, 1], \quad (5)$$

$$(n^*, s^*) = \text{argmax}_{n \in \mathcal{N}, s \in \mathcal{S}(n)} \left( \alpha \frac{c_n^s}{\lambda_n^s} - (1-\alpha) E_n^s \right), \text{ with } \alpha \in [0, 1], \quad (6)$$

$$(n^*, s^*) = \text{argmax}_{n \in \mathcal{N}, s \in \mathcal{S}(n)} \left( \alpha \frac{W_n^s}{\lambda_n^s} - (1-\alpha) E_n^s \right), \text{ with } \alpha \in [0, 1], \quad (7)$$

where $\lambda_n^s$ is the utilization of a frequency spectrum segment s available at network node n, $c_n^s$ is an estimate of the spectral efficiency provided by network node n in frequency spectrum segment s, $E_n^s$ is an indication of the energy cost for using frequency spectrum segment s at network node n; $\mathcal{N}$ is a set of network nodes associated with frequency spectrum utilization signals $S_{FUS}$ received by the user device 30; and $\mathcal{S}(n)$ is the set of frequency spectrum segment s available at network node $n \in \mathcal{N}$.

The present network node 10 may as explained above be a network control node or a network node of a radio communication network but can also be part of the core network of the wireless communication system. The network control node could e.g., be a NodeB in a radio access network or a logical node in core network, such as the operation administration maintenance (OAM) node in an LTE system, a Mobility Management Entity (MME), or a radio network controller (RNC).

The present user device 30 may be any wireless communication device with the capabilities to communicate with a radio communication network, such as UEs in LTE systems. The user device 30 can e.g., be a laptop, mobile phone, tablet computer, smart phone, etc.

Furthermore, any method according to the present invention may be implemented in a computer program, having code means, which when run by processing means causes the processing means to execute the steps of the method. The computer program is included in a computer readable medium of a computer program product. The computer readable medium may comprises of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that the present devices, network node device and user device, comprise the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the present solution.

Especially, the processors of the present devices may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the present invention is not limited to the embodiments described above, but also relates to and incorporates all embodiments within the scope of the appended independent claims.

What is claimed is:

1. A network node for a wireless communication system, the network node comprising:
  a transceiver, wherein the transceiver is configured to:
    transmit a frequency utilization signal $S_{FUS}$ comprising frequency utilization information (FUI) associated with at least one available frequency spectrum segment of the wireless communication system, wherein the FUI comprises traffic load of the at least one available frequency spectrum segment, and
    receive a communication preference signal $S_{CPS}$ associated with at least one user device, wherein the communication preference signal $S_{CPS}$ comprises communication preference information (CPI) for the at least one user device, the communication preference signal $S_{CPS}$ indicating a preferred network node in a plurality of network nodes and a preferred frequency spectrum segment available at the preferred network node, wherein the preferred network node and the preferred frequency spectrum segment are selected by the at least one user device as a preference for communication in the wireless communication system based on the FUI according to a transmission requirement of the at least one user device, and the preferred frequency spectrum segment is selected from the at least one available frequency spectrum segment of the wireless communication system, and wherein the preferred network node is different than the network node;
  a processor; and a memory storing a program to be executed in the processor, the program comprising instructions for:

assigning, for the at least one user device, at least one frequency spectrum segment for communication in the wireless communication system based on the CPI, and instructing the preferred network node to serve the at least one user device using the at least one frequency spectrum segment that is assigned.

2. The network node according to claim 1, wherein the frequency utilization information comprises one or more in a group comprising, frequency bandwidth information, utilization priority information, energy cost information, supportable traffic load information, supportable/admissible service type information, supportable/admissible traffic type information, and uplink or downlink carrier type information.

3. The network node according to claim 1,
wherein the program comprises further instructions for determining, based on the CPI, frequency assignment information associated with the at least one frequency spectrum segment for the at least one user device; and
wherein the transceiver is further configured to transmit a frequency assignment control signal $S_{FACS}$ comprising the frequency assignment information to the at least one user device.

4. The network node according to claim 3, wherein the frequency assignment information comprises one or more in a group comprising: admission grant, admission denial, frequency address for the at least one frequency spectrum segment for communication, radio access technology, and network node identity.

5. The network node according to claim 3,
wherein the transceiver is further configured to:
receive additional frequency assignment information associated with the at least one user device from other network nodes of the wireless communication system;
transmit the additional frequency assignment information to the at least one user device; or
wherein the program comprises further instructions for using the additional frequency assignment information for serving the at least one user device.

6. The network node according to claim 1, wherein the transceiver is further configured to transmit the frequency utilization signal $S_{FUS}$ over a broadcast channel, or over a physical control channel, or over a higher layer Radio Resource Control (RRC) control channel of the wireless communication system.

7. The network node according to claim 1, wherein the network node is an access node or a network control node.

8. The network node according to claim 1,
wherein the transceiver is further configured to receive additional frequency utilization information from other network nodes; and
wherein the program comprises further instructions for using the additional frequency utilization information when assigning the at least one frequency spectrum segment.

9. The network node according to claim 1, wherein the transceiver is further configured to:
receive the communication preference information for the at least one user device from at least another network node.

10. A user device for a wireless communication system, the user device comprising:
a transceiver;
a processor; and
a memory storing a program to be executed in the processor,
wherein the transceiver configured to receive a frequency utilization signal $S_{FUS}$ comprising frequency utilization information (FUI) of a plurality of network nodes, the FUI associated with at least one available frequency spectrum segment of the wireless communication system, and comprising traffic load of the at least one available frequency spectrum segment,
wherein the program comprises instructions for selecting, based on the FUI for the user device, a preferred network node in the plurality of network nodes and a preferred frequency spectrum segment available at the preferred network node that has a spectral efficiency satisfying a criterion, wherein the preferred network node and the preferred frequency spectrum segment are selected by the user device as a preference for communication in the wireless communication system, and the preferred frequency spectrum segment is selected from the at least one available frequency spectrum segment, and
wherein the transceiver is further configured to transmit a communication preference signal $S_{CPS}$ comprising communication preference information (CPI) to at least one network node, causing the at least one network node to instruct the preferred network node to serve the user device using the preferred frequency spectrum segment that is assigned, wherein the CPI indicates the preferred network node and the preferred frequency spectrum segment.

11. The user device according to claim 10, wherein the frequency utilization information further comprises frequency bandwidth information, utilization priority information, energy cost information, supportable traffic load information, supportable/admissible service type information, supportable/admissible traffic type information, or uplink or downlink carrier type information.

12. The user device according to claim 10, wherein the CPI comprises two preferred frequency spectrum segments, or two preferred network nodes.

13. The user device according to claim 10, wherein the program comprises further instructions for determining at least one preferred frequency spectrum segment s* or at least one preferred network node n* by satisfying one of following criteria:

$$(n^*, s^*) = \mathrm{argmax}_{n \in N, s \in S(n)} \left( \alpha \frac{W_n^s c_n^s}{\lambda_n^s} - (1-\alpha)E_n^s \right), \text{with } \alpha \in [0, 1],$$

$$(n^*, s^*) = \mathrm{argmax}_{n \in N, s \in S(n)} \left( \alpha \frac{c_n^s}{\lambda_n^s} - (1-\alpha)E_n^s \right), \text{with } \alpha \in [0, 1],$$

$$(n^*, s^*) = \mathrm{argmax}_{n \in N, s \in S(n)} \left( \alpha \frac{W_n^s}{\lambda_n^s} - (1-\alpha)E_n^s \right), \text{with } \alpha \in [0, 1],$$

where $W_n^s$ represents a size of a frequency spectrum segment s available at a network node n, $\lambda_n^s$ is utilization of the frequency spectrum segment s available at the network node n, $c_n^s$ is an estimate of a spectral efficiency provided by network node n in frequency spectrum segment s, $E_n^s$ is an indication of an energy cost for using frequency spectrum segment s at network node n; $\mathcal{N}$ is a set of network nodes associated with frequency spectrum utilization signals $S_{FUS}$ received by the user device; and $\mathcal{S}(n)$ is a set of frequency spectrum segment s available at network node $n \in \mathcal{N}$.

14. The user device according to claim 10, wherein the transceiver is further configured to:
receive a frequency assignment control signal $S_{FACS}$ comprising frequency assignment information (FAI) for the user device; and the program comprises further instructions for using the frequency assignment information when communicating with at least one network node.

15. The user device according to claim 10, wherein the program comprises further instructions for:
computing one or more estimates, associated with the at least one available frequency spectrum segment and at least one network node, wherein the one or more estimates comprise one or more from a group comprising: achievable spectral efficiency, average achievable spectral efficiency, achievable data rate, average achievable data rate, achievable latency, average achievable latency, achievable maximum data rate, achievable minimum data rate, and average number of available frequency resources; and
using the one or more estimates when determining the communication preference information.

16. A method in a network node for a wireless communication system, the method comprising:
transmitting a frequency utilization signal $S_{FUS}$ comprising frequency utilization information (FUI) associated with at least one available frequency spectrum segment, wherein the FUI comprises traffic load of the at least one available frequency spectrum segment;
receiving a communication preference signal $S_{CPS}$ associated with at least one user device, wherein the communication preference signal $S_{CPS}$ comprises communication preference information (CPI) for the at least one user device, the CPI indicating a preferred network node in a plurality of network nodes and a preferred frequency spectrum segment available at the preferred network node, wherein the preferred network node and the preferred frequency spectrum segment are selected by the at least one user device as a preference for communication in the wireless communication system based on the FUI according to a transmission requirement of the at least one user device, and the preferred frequency spectrum segment is selected from the at least one available frequency spectrum segment of the wireless communication system, the communication preference signal $S_{CPS}$ indicating that the at least one user device prefers to communicate over the preferred frequency spectrum segment, and wherein the preferred network node is different than the network node;
assigning, for the at least one user device, at least one frequency spectrum segment for communication in the wireless communication system based on the communication preference information; and
instructing the preferred network node to serve the at least one user device using the at least one frequency spectrum segment that is assigned.

17. A method in a user device for a wireless communication system, the method comprising:
receiving a frequency utilization signal $S_{FUS}$ comprising frequency utilization information (FUI) of a plurality of network nodes, the FUI associated with at least one available frequency spectrum segment and comprising traffic load of the at least one available frequency spectrum segment;
determining, based on the FUI for the user device, a preferred network node in the plurality of network nodes, and a preferred frequency spectrum segment available at the preferred network node that has a spectral efficiency satisfying a criterion, wherein the preferred network node and the preferred frequency spectrum segment are selected by the user device as a preference for communication in the wireless communication system, and the preferred frequency spectrum segment is selected from the at least one available frequency spectrum segment;
determining communication preference information (CPI) indicating the preferred network node and the preferred frequency spectrum segment; and
transmitting a communication preference signal $S_{CPS}$ comprising the CPI to at least one network node, the communication preference signal $S_{CPS}$ indicating that the user device prefers to communicate over the preferred frequency spectrum segment, and causing the at least one network node to instruct the preferred network node to serve the user device using the preferred frequency spectrum segment that is assigned.

* * * * *

UNITED STATES PATENT AND TRADEMARK OFFICE
CERTIFICATE OF CORRECTION

PATENT NO. : 10,264,582 B2
APPLICATION NO. : 15/403056
DATED : April 16, 2019
INVENTOR(S) : Soldati et al.

It is certified that error appears in the above-identified patent and that said Letters Patent is hereby corrected as shown below:

In the Claims

In Column 21, Line 12, Claim 2, delete "a group comprising," and insert --a group comprising:--.

In Column 22, Lines 47-60, Claim 13, delete the equations and insert $(n^\star, s^\star) = arg\ \max_{n \in \mathcal{N}, s \in \mathcal{S}(n)} \left( \alpha \frac{W_n^s c_n^s}{\lambda_n^s} - (1 - \alpha) E_n^s \right)$, with $\alpha \in [0,1]$, $(n^\star, s^\star) = arg\ \max_{n \in \mathcal{N}, s \in \mathcal{S}(n)} \left( \alpha \frac{c_n^s}{\lambda_n^s} - (1 - \alpha) E_n^s \right)$, with $\alpha \in [0,1]$, $(n^\star, s^\star) = arg\ \max_{n \in \mathcal{N}, s \in \mathcal{S}(n)} \left( \alpha \frac{W_n^s}{\lambda_n^s} - (1 - \alpha) E_n^s \right)$, with $\alpha \in [0,1]$,

-- --.

Signed and Sealed this
Twenty-fourth Day of March, 2020

Andrei Iancu
*Director of the United States Patent and Trademark Office*